US009316288B2

(12) United States Patent
Kobayashi et al.

(10) Patent No.: US 9,316,288 B2
(45) Date of Patent: Apr. 19, 2016

(54) ROTATIONAL FORCE TRANSMITTING APPARATUS

(71) Applicant: NAMIKI SEIMITSU HOUSEKI KABUSHIKI KAISHA, Tokyo (JP)

(72) Inventors: Yasuyuki Kobayashi, Kuroishi (JP); Kinya Odagiri, Kuroishi (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/398,082

(22) PCT Filed: Apr. 24, 2013

(86) PCT No.: PCT/JP2013/062058
§ 371 (c)(1),
(2) Date: Oct. 30, 2014

(87) PCT Pub. No.: WO2013/164969
PCT Pub. Date: Nov. 7, 2013

(65) Prior Publication Data
US 2015/0126326 A1     May 7, 2015

(30) Foreign Application Priority Data

May 1, 2012   (JP) ................................. 2012-104861

(51) Int. Cl.
| F16D 41/10 | (2006.01) |
| F16H 1/28 | (2006.01) |
| F16H 1/46 | (2006.01) |
| F16D 43/02 | (2006.01) |

(52) U.S. Cl.
CPC ............ *F16H 1/2863* (2013.01); *F16D 41/105* (2013.01); *F16D 43/02* (2013.01); *F16H 1/46* (2013.01)

(58) Field of Classification Search
CPC .... F16H 1/2863; F16D 41/105; F16D 41/086
USPC .......................................................... 192/38
See application file for complete search history.

(56) References Cited

U.S. PATENT DOCUMENTS

| 5,121,019 | A | 6/1992 | Pradler | |
| 2004/0245061 | A1* | 12/2004 | Ohishi et al. | ..................... 192/45 |
| 2006/0287157 | A1* | 12/2006 | Katoh et al. | .................. 475/263 |
| 2014/0069761 | A1* | 3/2014 | Schoolcraft | .............. 192/45.005 |

FOREIGN PATENT DOCUMENTS

| JP | 63-062957 A | 3/1988 |
| JP | 01-177936 U | 12/1989 |

(Continued)

OTHER PUBLICATIONS

International Search Report; PCT/JP2013/062058; Jul. 2, 2013.

*Primary Examiner* — Justin Holmes
*Assistant Examiner* — Stacey Fluhart
(74) *Attorney, Agent, or Firm* — Studebaker & Brackett PC

(57) ABSTRACT

Provided is a rotational force transmitting apparatus that can prevent jolting of an output shaft in a circumferential direction caused by jolting in an input-side mechanism in the circumferential direction, has a thin and small structure, and is excellent in productivity. In the rotational force transmitting apparatus, a clutch mechanism 1 and a planetary gear mechanism 2 are axially coupled in a fixing member 10, and a rotational force inputted to a sun gear 62 of the planetary gear mechanism 2 is outputted from an output rotation member 20 of the clutch mechanism 1. On the fixing member 10, a substantially columnar inner-circumferential surface is provided. A housing chamber 11 housing the clutch mechanism 1 is constituted by the inner circumferential surface on one side in an axial direction. An internal gear 2a of the planetary gear mechanism 2 engaging with planetary gears 61 is provided on the other side.

4 Claims, 4 Drawing Sheets

(56) References Cited

FOREIGN PATENT DOCUMENTS

| | | | |
|---|---|---|---|
| JP | 2003-232390 A | 8/2003 | |
| JP | 2007-002934 A | 1/2007 | |
| JP | 2007-170547 A | 7/2007 | |

* cited by examiner

ROTATIONAL FORCE TRANSMITTING APPARATUS

TECHNICAL FIELD

The present invention relates to a rotational force transmitting apparatus for adjusting an input-side rotation to appropriate number of rotations and appropriate torque and outputting the input-side rotation.

BACKGROUND ART

Examples of the conventional rotational force transmitting apparatuses include a rotational force transmitting apparatus in which rotation of an input-side gear is transmitted to an output-side gear via multi-stages of gears and a rotational force transmitting apparatus in which a rotation shaft of a motor or a rotation shaft of another gear is connected to an output shaft via a rotation transmitting member such as a key and a spline.

However, those conventional rotational force transmitting apparatuses have jolting (a slightly moving state, not fixed completely as a machine) caused by backlash between gears, a slight gap between a key and an output shaft, or the like. The conventional rotational force transmitting apparatuses further have a structure in which jolting in a rotational direction is accumulated before a rotational force is transmitted to the output shaft. In such a structure, in a stationary state in which a rotational force is not inputted to an input side, jolting accumulated in the rotational direction as described above is caused in the output shaft.

In view of this, there is proposed a mechanism for reducing jolting of an output shaft. This mechanism is a combination of a rotational force transmitting mechanism including a plurality of gears and a reverse input clutch. The reverse input clutch transmits an input-side rotational force to the output shaft, but does not cause the output shaft to rotate due to a rotational force inputted from an output side.

For example, in an invention described in Patent Document 1, a motor, a speed reducer for reducing a speed of torque inputted from the motor, and a reverse input prevention clutch for inputting the torque from the speed reducer to an input-side member and outputting the torque from an output-side member are integrated as a unit.

According to this conventional art, the output-side member has a structure in which even if jolting in a rotational direction is accumulated in the output-side member by the motor, the speed reducer, or the like, the output-side member is not rotated by a rotational force from an outside. Therefore, in a stationary state in which a rotational force is not inputted to an input side, it is possible to prevent jolting of an output shaft in a circumferential direction. However, in order to apply this conventional art, in particular, to a thin and small actuator, a further devise is necessary, and improvement in productivity thereof is also demanded.

CITATION LIST

Patent Literature

Patent Document 1: JP-A-2003-56596

SUMMARY OF INVENTION

Problems to be Solved by the Invention

The present invention has been made in view of the above conventional circumstances. An object of the present invention is to provide a rotational force transmitting apparatus that can prevent jolting of an output shaft in a circumferential direction, the jolting being caused by jolting in an input-side mechanism in the circumferential direction, has a thin and small structure, and is excellent in productivity.

Solutions to the Problems

Means for solving the above problems is a rotational force transmitting apparatus configured to couple a clutch mechanism and a planetary gear mechanism to each other in an axial direction in a fixing member to output from an output rotation member of the clutch mechanism a rotational force inputted to a sun gear of the planetary gear mechanism. The clutch mechanism includes a housing chamber having a columnar space, an output rotation member coaxially housed in the housing chamber, an input rotation member coaxially disposed on the output rotation member, engagement elements disposed between an inner circumferential surface of the housing chamber and an outer circumferential surface of the output rotation member, and biasing members configured to bias the respective engagement elements toward one side in a circumferential direction; the clutch mechanism is configured such that cam surfaces are disposed on the outer circumferential surface of the output rotation member so that a distance between each of the cam surfaces and the inner circumferential surface of the housing chamber is gradually reduced toward the one side in the circumferential direction and in a case where the input rotation member is rotated toward the other side opposite to the one side in the circumferential direction, the input rotation member is configured to be abutted against the engagement elements and thereafter abutted against the output rotation member to thereby push the output rotation member; the planetary gear mechanism includes a plurality of planetary gears rotatably supported by the input rotation member, and the sun gear engaging with the plurality of planetary gears from a center; and the fixing member has an inner circumferential surface having a substantially columnar shape, the inner circumferential surface on one side in the axial direction constituting the housing chamber, the inner circumferential surface on the other side in the axial direction constituting an internal gear engaging with the plurality of planetary gears.

Effects of the Invention

The present invention is configured as described above, and therefore has effects as described below.

Because a rotational force is outputted from a clutch mechanism, it is possible to prevent jolting of an output shaft in a circumferential direction, the jolting being caused by jolting in an input-side mechanism in a circumferential direction. In addition, the clutch mechanism is provided on one side in an axial direction of a substantially columnar innercircumferential surface in a fixing member and a planetary gear mechanism is provided on the other side in the axial direction thereof. Therefore, the present invention has a thin and small structure and is excellent in productivity.

DESCRIPTION OF EMBODIMENTS

Figure 1:
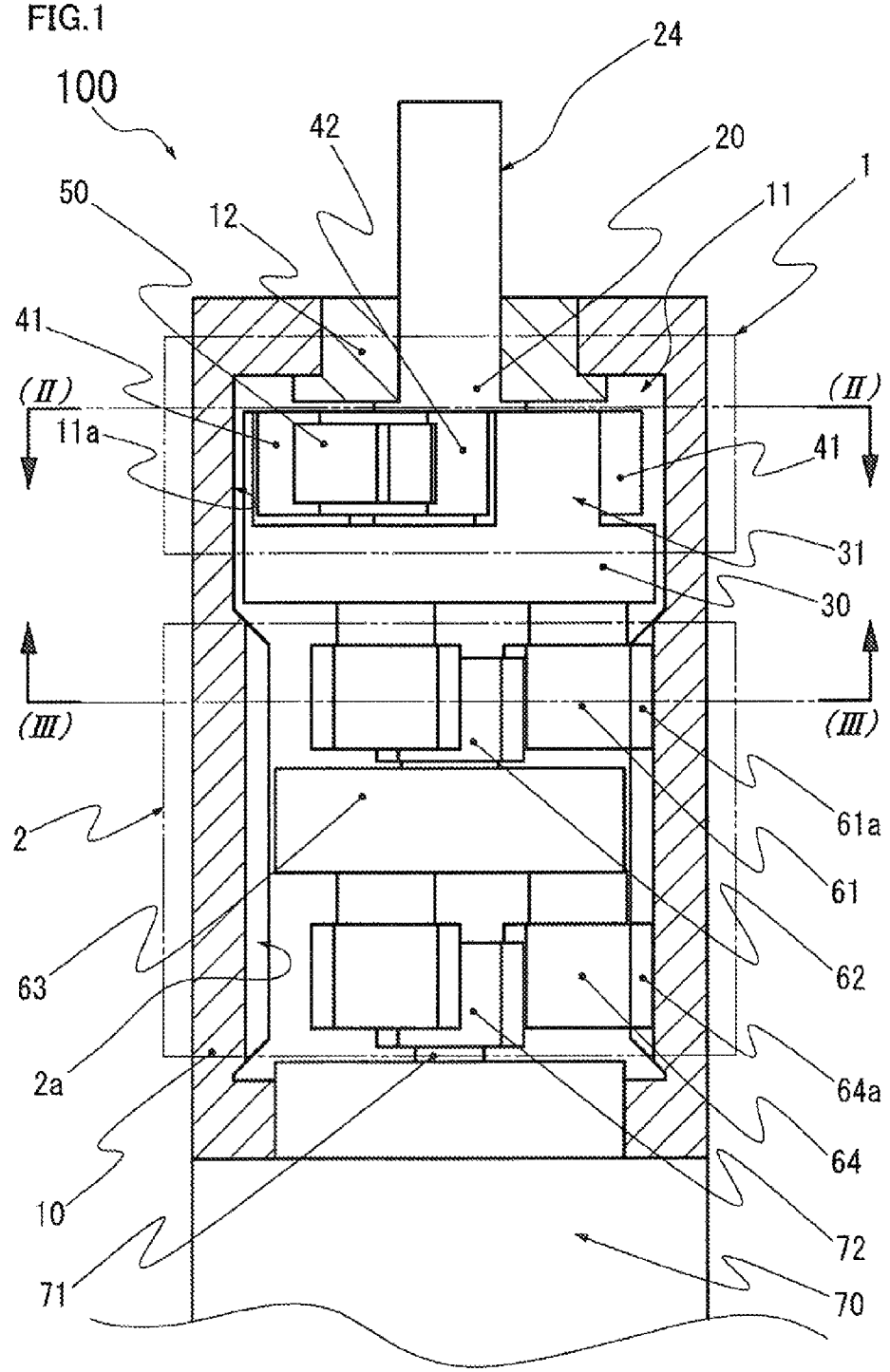
FIG. 1 is a longitudinal sectional view illustrating an example of a rotational force transmitting apparatus according to the present invention.

A first embodiment for implementing the present invention is a rotational force transmitting apparatus configured to couple a clutch mechanism and a planetary gear mechanism to each other in an axial direction in a fixing member to output from an output rotation member of the clutch mechanism a rotational force inputted to a sun gear of the planetary gear mechanism. The clutch mechanism includes a housing chamber having a columnar space, an output rotation member coaxially housed in the housing chamber, an input rotation member coaxially disposed on the output rotation member, engagement elements disposed between an inner circumferential surface of the housing chamber and an outer circumferential surface of the output rotation member, and biasing members configured to bias the respective engagement elements toward one side in a circumferential direction; the clutch mechanism is configured such that cam surfaces are disposed on the outer circumferential surface of the output rotation member so that a distance between each of the cam surfaces and the inner circumferential surface of the housing chamber is gradually reduced toward the one side in the circumferential direction and in a case where the input rotation member is rotated toward the other side opposite to the one side in the circumferential direction, the input rotation member is configured to be abutted against the engagement elements and thereafter abutted against the output rotation member to thereby push the output rotation member; the planetary gear mechanism includes a plurality of planetary gears rotatably supported by the input rotation member, and the sun gear engaging with the plurality of planetary gears from a center; and the fixing member has an inner circumferential surface having a substantially columnar shape, the inner circumferential surface on one side in the axial direction constituting the housing chamber, the inner circumferential surface on the other side in the axial direction constituting an internal gear engaging with the plurality of planetary gears.

According to this embodiment, when a rotational force is inputted to the sun gear, the plurality of planetary gears is rotated in accordance with rotation of the sun gear. Those planetary gears are rolled while engaging with the internal gear on the inner circumferential surface of the fixing member. In accordance with this rolling, the input rotation member supporting the plurality of planetary gears is also rotated. Subsequently, the rotated input rotation member is abutted against the engagement elements, so that friction between the engagement elements and the cam surfaces and friction between the engagement elements and the inner circumferential surface of the housing chamber are reduced. Thereafter, the input rotation member is abutted against the output rotation member to thereby push the output rotation member. As a result, the output rotation member is smoothly rotated in the other direction.

In a case where a rotational force in the other direction is applied to the output rotation member from an outside, the engagement elements are strongly thrust between the cam surfaces of the output rotation member to be rotated in the other direction and the inner circumferential surface of the housing chamber. Therefore, the rotation in the other direction of the output rotation member is inhibited.

Therefore, it is possible to prevent jolting of the output rotation member in the circumferential direction, the jolting being caused by jolting in the circumferential direction in the planetary gear mechanism.

In a second embodiment, an appropriately adjusted rotational force is efficiently transmitted. For this purpose, in the second embodiment according to the first embodiment includes a support-rotating member fixed to be rotatably integrated with the sun gear on the other side of the sun gear; a plurality of coupled planetary gears rotatably supported by the support-rotating member; and an internal gear engaging with the plurality of coupled planetary gears, the internal gear being provided on the inner circumferential surface of the fixing member; and the sun gear, the support-rotating member, the plurality of coupled planetary gears, and the internal gear engaging with the plurality of coupled planetary gears are provided at multi-stages so that a rotational force is transmitted in the axial direction.

Here, as an embodiment, the internal gear may be a single internal gear that is continuously provided in the axial direction to engage with the planetary gears of the first embodiment and engage with the coupled planetary gears of the second embodiment. Alternatively, as another embodiment, the internal gear may be a plurality of internal gears arranged in the axial direction to correspond to the planetary gears of the first embodiment and correspond to the coupled planetary gears of the second embodiment.

In a third embodiment, in particular, reduction in size, improvement in productivity, improvement in operativeness, improvement in durability, and the like of the clutch mechanism are intended. For this purpose in the third embodiment according to the first or second embodiment, the clutch mechanism includes recesses each of which is adjacent to the one side of the cam surface and is provided on the outer circumferential surface of the output rotation member; pressure transmitting parts each of which is provided on the input rotation member, is fitted into the recess with play in the circumferential direction, and is protruded from an inside of the recess in a centrifugal direction; and in a case where the input rotation member is rotated toward the other side, the pressure transmitting parts are abutted against the engagement elements to thereby push the engagement elements, and thereafter the pressure transmitting parts are abutted against end surfaces in the circumferential direction of the recesses to thereby push the output rotation member.

In a fourth embodiment in any one of the first to third embodiments, the cam surface is provided on a convex surface that is curved in the circumferential direction.

According to this embodiment, because the cam surface is provided on the convex surface that is curved in the circumferential direction, an angle between a tangent between the inner circumferential surface of the housing chamber and the each engagement element and a tangent between the each engagement element and the cam surface can be relatively large. Consequently, the engagement element easily bites into a wedge part provided by the inner circumferential surface of the housing chamber and the cam surface. Therefore, by placing the engagement element on a deeper side of the wedge part, a size of the present invention can be reduced.

In a fifth embodiment, a similar effect can be obtained in a case where the rotation input member is rotated in either one direction or the other direction. For this purpose, in the fifth embodiment according to any one of the first to fourth embodiments, the engagement elements are provided in pair; each of the biasing members is configured to bias the pair of the engagement elements so that one of the pair of the engagement elements is biased toward one side and the other thereof is biased toward the other side, the one side and the other side being opposite to each other in the circumferential direction; the cam surfaces includes multiple sets of first cam surfaces and second cam surfaces which are provided in the circumferential direction, the first cam surfaces being provided so that a distance between each of the first cam surfaces and the inner circumferential surface of the housing chamber is gradually reduced toward the one side, the second cam surfaces being provided so that a distance between each of the second cam surfaces and the inner circumferential surface of the housing chamber is gradually reduced toward the other side; the one of the pair of the engagement elements is arranged to be brought into contact with the first cam surface and the inner circumferential surface of the housing chamber, and the other of the pair of the engagement elements is arranged to be brought into contact with the other cam surface and the inner circumferential surface of the housing chamber; and in a case where the input rotation member is rotated toward the other side, the input rotation member is configured to be abutted against the one of the pair of the engagement elements and thereafter abutted against the output rotation member to thereby push the output rotation member toward the other side, and, in a case where the input rotation member is rotated toward the one side, the input rotation member is configured to be abutted against the other of the pair of the engagement elements and thereafter abutted against the output rotation member to thereby push the output rotation member toward the one side.

Particularly preferable examples of the embodiments will be described in detail with reference to drawings.

EXAMPLE

FIG. 1 is a longitudinal sectional view illustrating an internal structure of a rotational force transmitting apparatus 100 in this example. This longitudinal sectional view shows only a fixing member 10 housing a mechanism section and an output-side support member 12.

In the rotational force transmitting apparatus 100, as illustrated in FIG. 1, a clutch mechanism 1 and a planetary gear mechanism 2 are coupled to each other in an axial direction in the fixing member 10. The rotational force transmitting apparatus 100 is configured so that a rotational force inputted to a sun gear 62 of the planetary gear mechanism 2 is outputted from an output rotation member 20 of the clutch mechanism 1.

The fixing member 10 having a tubular shape has an inner circumferential surface having a substantially columnar shape. The fixing member 10 includes a housing chamber 11 having an inner circumferential surface 11a on one side (upper side in FIG. 1) in an axial direction thereof and constituting the clutch mechanism 1. The fixing member 10 further includes an internal gear 2a provided by the inner circumferential surface on the other side in the axial direction (lower side in FIG. 1) and constituting the planetary gear mechanism 2.

The inner circumferential surface 11a on the one side is a smooth curved-surface having a tubular inner circumference.

The internal gear 2a is provided on the other side of the fixing member 10 over a whole circumference of the inner circumferential surface of the fixing member 10, and teeth are successively provided in the axial direction so as to extend over first planetary gears and second planetary gears (coupled planetary gears) (described below).

An output-side support member 12 is integrally fixed to the fixing member 10 at an end on the one side of the fixing member 10. The output-side support member 12 rotatably supports an output rotation member 20 and allows an output shaft 24 of the output rotation member 20 to penetrate therethrough, and the output shaft 24 is exposed to an outside. An input rotary motor 70 is integrally arranged with the fixing member 10 on the other side of the fixing member 10. A sun gear 72 is fixed to one end of a rotation shaft 71 of the rotary motor 70.

The fixing member 10 and the rotary motor 70 are non-rotatably fixed to an immovable part (not shown).

Figure 2:
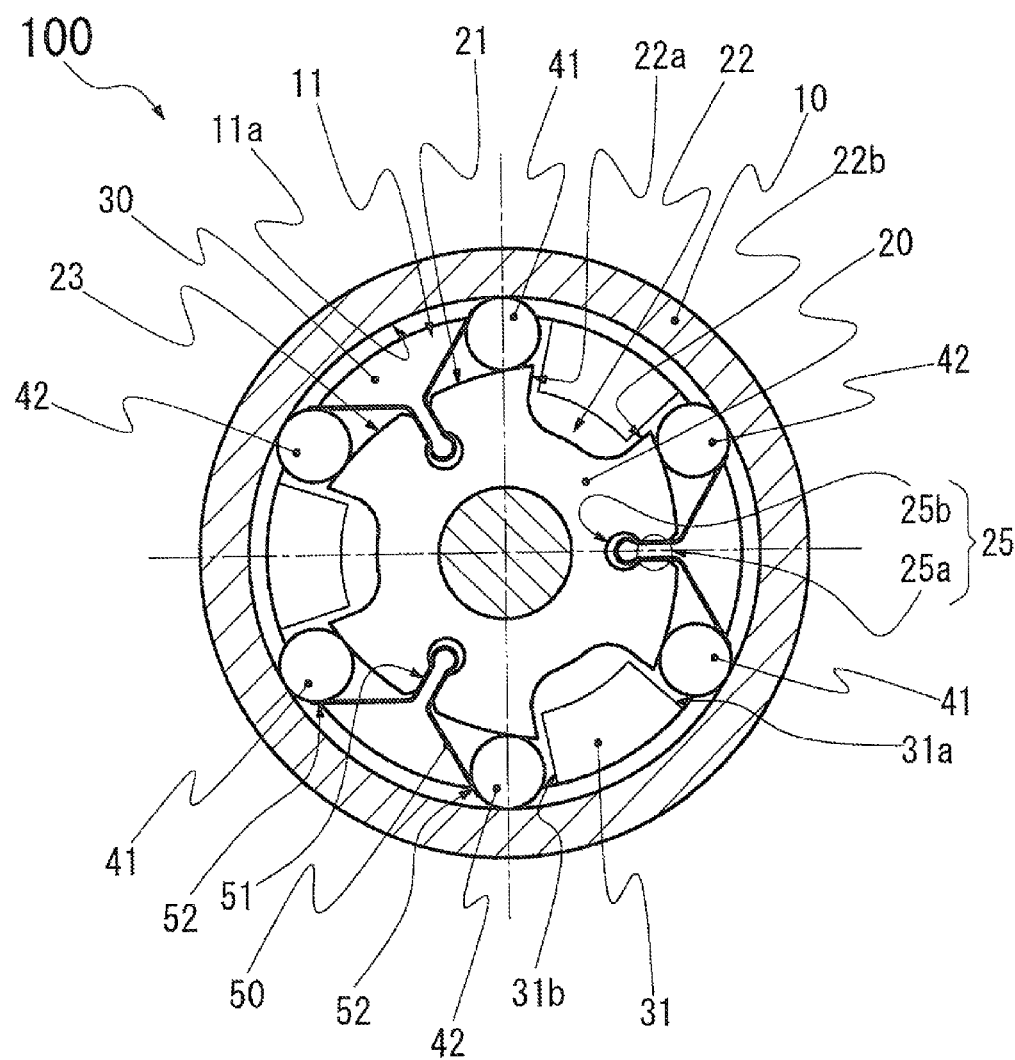
FIG. 2 is a sectional view taken along the line (II)-(II) of FIG. 1.
Figure 3:
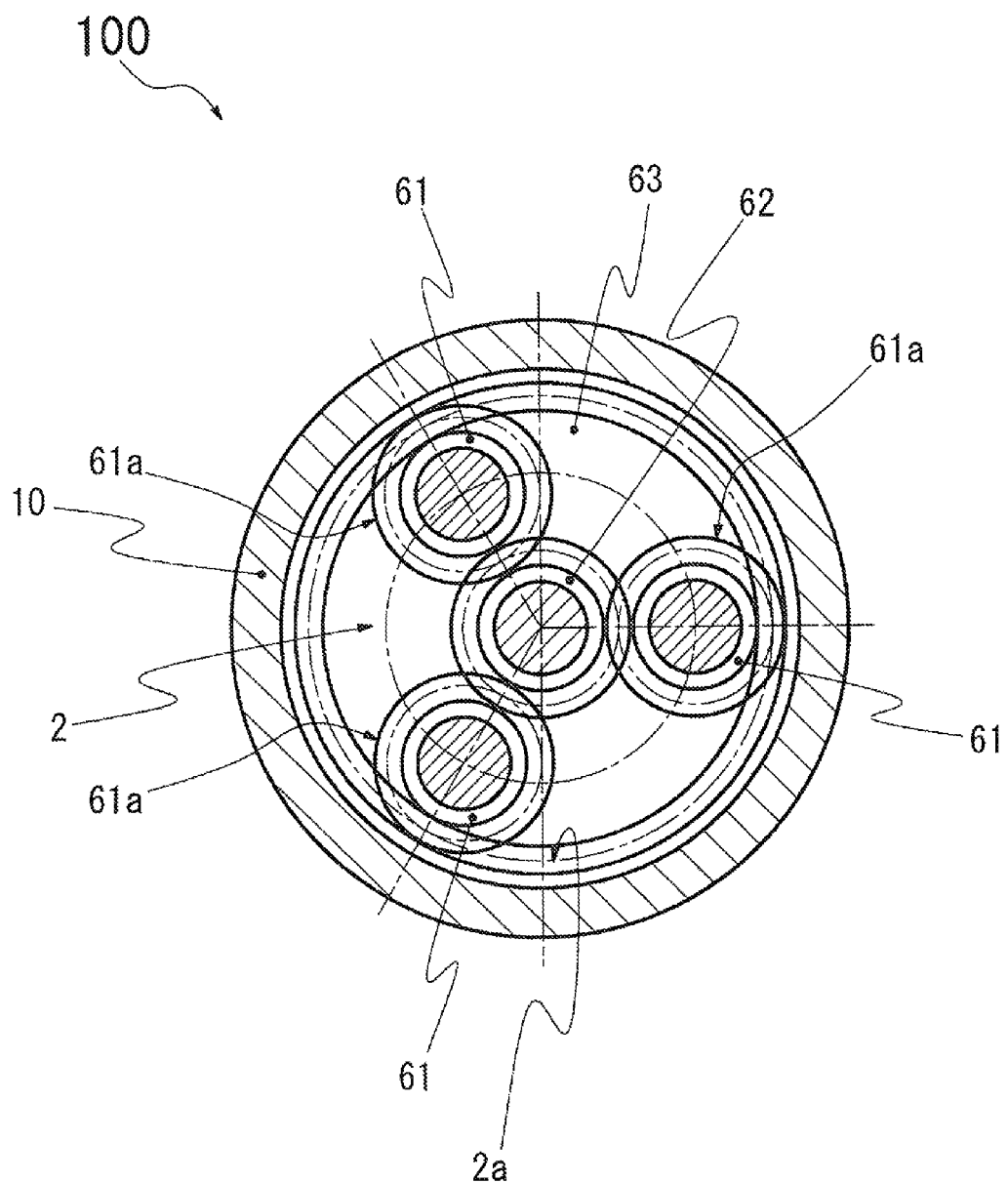
FIG. 3 is a sectional view taken along the line (III)-(III) of FIG. 1.

As shown in FIG. 1 and FIG. 2, the clutch mechanism 1 includes, in the housing chamber 11 provided at one end in the axial direction of the fixing member 10, an output rotation member 20, an input rotation member 30, and pairs of engagement elements 41 and 42, and biasing members 50. The output rotation member 20 and the housing chamber 11 are coaxially arranged. The input rotation member 30 and the output rotation member 20 are coaxially arranged. The pairs of engagement elements 41 and 42 are positioned between the inner circumferential surface 11a of the housing chamber and an outer circumferential surface of the output rotation member 20. Each of the biasing members 50 biases one of the pair of the engagement elements 41 toward one side (clockwise direction in FIG. 2) in the circumferential direction and biases the other of the pair of the engagement elements 42 toward the other side (counterclockwise direction in FIG. 2) in the circumferential direction.

In a case where the input rotation member 30 receives a rotational force from the planetary gear mechanism 2 (described below), the clutch mechanism 1 transmits the rotational force to the output rotation member 20 to thereby rotate the output rotation member 20. In a case where a rotational force is applied to the output rotation member 20 from an outside, the clutch mechanism 1 non-rotatably locks the output rotation member 20.

The output rotation member 20 is a substantially disk-like member arranged to be concentric with the housing chamber 11. A center of the output rotation member 20 is rotatably supported by the output-side support member 12 integrated with the fixing member 10. A part at one end (upper end in FIG. 1) in the axial direction of the output rotation member 20 is rotatably fitted into the fixing member 10. The part integrally has, at a center thereof, the output shaft 24 that is exposed to the outside.

An outer circumferential part of the output rotation member 20 includes first cam surfaces 21, recesses 22, second cam surfaces 23, and locking parts 25. A distance between each first cam surface 21 and the inner circumferential surface 11a of the housing chamber 11 is gradually reduced toward the one side (clockwise direction in FIG. 2) in the circumferential direction. Each of the recesses 22 is adjacent to the first cam surface 21 on the one side. A distance between the each second cam surface 23 and the inner circumferential surface 11a of the housing chamber 11 is gradually reduced toward the other side (counterclockwise direction in FIG. 2) which is opposite to the one side of the cam surface 21. Each of the locking parts 25 locks the biasing member 50. Multiple sets (3 sets in the drawing) of the cam surfaces 21, the recesses 22, the cam surfaces 23, and the locking parts 25 are provided at predetermined angles (at regular intervals).

The cam surfaces 21 and the cam surfaces 23 are symmetrically provided. Each of the cam surfaces 21 and 23 is a convex surface that is curved in the circumferential direction. More specifically, each of the cam surfaces 21 and 23 has an arc shape having a radius that has a larger value than a value obtained by distracting a diameter of each of the engagement elements 41 and 42 from a radius of the inner circumferential surface 11a of the housing chamber. Each of the cam surfaces 21 and 23 is provided so that a center of the arc is off a center of the output rotation member 20.

The recess 22 is centripetally recessed from the outer circumferential surface of the output rotation member 20 and is passed through in the axial direction of the output rotation member 20. The recess 22 includes, at both ends in the circumferential direction thereof, pressed surfaces 22a and 22b pressed by a pressure transmitting part 31 of the input rotation member 30 (described below). The pressed surfaces 22a and 22b are flat surfaces extending in a diameter direction. The pressed surface 22a intersects the first cam surface 21. The pressed surface 22b intersects the second cam surface 23.

The locking part 25 is a recess between the first cam surface 21 and the second cam surface 23 that are oppositely positioned in the outer circumferential part of the output rotation member 20. Specifically, the locking part 25 includes an inserting space 25a that allows the biasing member 50 to insert thereinto and a bottom space 25b that is in a position deeper (bottom side) than that of the inserting part.

The inserting space 25a is a space having a certain width. The bottom space 25b is a space having a width wider in the circumferential direction than that of the inserting space 25a. In the inserting space 25a and the bottom space 25b, a base end portion of the biasing member 50 to be inserted is fixed so as not to be easily pulled out.

The input rotation member 30 is a substantially disk-like member provided to be adjacent to the output rotation member 20 in the axial direction.

One end (upper end in FIG. 1) in the axial direction of the input rotation member 30 is fitted, at a center thereof, into the output rotation member 20 so that the input rotation member 30 is rotatable with respect to the output rotation member 20 in both directions. The other end in the axial direction of the input rotation member 30 is connected to the planetary gear mechanism 2 (described below).

On a side surface of the input rotation member 30 on an output-rotation-member-20 side, the plurality of pressure transmitting parts 31 (3 in this example) is provided at predetermined intervals so that the pressure transmitting parts 31 are protruded to correspond to the recesses 22, respectively, in the circumferential direction.

Each of the pressure transmitting parts 31 and the recess 22 of the output rotation member 20 are fitted into each other with play in the circumferential direction. The pressure transmitting part 31 is a fan-shaped member that is centrifugally protruded from the recess 22. The pressure transmitting part 31 has abutting surfaces 31a and 31b at both ends in the circumferential direction. The abutting surfaces 31a and 31b can be abutted against the pressed surfaces 22a and 22b of the output rotation member 20, respectively, and can be also abutted against the engagement elements 41 and 42, respectively.

The abutting surfaces 31a and 31b are continuously provided from an inside of the recess 22 toward an outside of the recess 22 in the diameter direction. The abutting surface 31a is a flat surface substantially in parallel with one of the pressed surfaces 22a of the recess 22. The abutting surface 31b is a flat surface substantially in parallel with the other pressed surface 22b of the recess 22.

A width between the abutting surfaces 31a and 31b in the circumferential direction is slightly smaller than a width between the pressed surfaces 22a and 22b in the circumferential direction in the output rotation member 20.

The engagement elements 41 and 42 have a columnar shape or a spherical shape (columnar shape in the illustrated example). The engagement elements 41 and 42 are provided in pair so as to correspond to the first cam surface 21 and second cam surfaces 23, respectively.

The engagement element 41 of the pair of the engagement elements 41 and 42 is arranged to be brought into contact with the first cam surface 21 and the inner circumferential surface 11a of the housing chamber. The other of the pair of the engagement elements 42 is arranged to be brought into contact with the second cam surface 23 and the inner circumferential surface 11a of the housing chamber. In a state of being pressed by the biasing member 50 (described below), the engagement elements 41 and 42 are held to be slightly protruded more deeply toward the inside of the recess 22 than the pressed surfaces 22a and 22b, respectively, of the recess 22.

The biasing member 50 is a long-plate like spring member that is bent substantially in Y-shape. The biasing member 50 includes a fastening part 51 fastened to the locking part 25 of the output rotation member 20 and two pressing parts 52 and 52 extendingly bifurcated from the fastening part 51. The biasing member 50 biases the pair of the engagement elements 41 and 42 to separate the pair of the engagement elements 41 and 42 with use of the pressing parts 52 and 52.

The fastening part 51 has a substantially circular part corresponding to the bottom space 25b of the locking part 25 on an outer circumference of the output rotation member 20 and a narrow parallel plate part corresponding to the inserting space 25a of the locking part 25.

Each of the pressing parts 52 is extendingly provided from the fastening part 51 and is inclined toward the cam surface 21 (or toward the cam surface 23). An inclined surface of the pressing part 52 is abutted against an outer circumferential surface of the corresponding engagement element 41 (or the corresponding engagement element 42).

The input rotation member 30 of the clutch mechanism 1 having the above configuration is coaxially coupled to the planetary gear mechanism 2 in the fixing member 10.

The planetary gear mechanism 2 includes a plurality of first planetary gears 61, a sun gear 62, a support-rotating member 63, a plurality of second planetary gears 64 (coupled planetary gears), and the internal gear 2a provided on the inner circumferential surface of the fixing member 10. The first planetary gears 61 are rotatably supported by the input rotation member 30. The sun gear 62 engages with the first planetary gears 61 from a center. The support-rotating member 63 is fixed to the other end of the sun gear 62 in the axial direction. The second planetary gears 64 are rotatably supported by the support-rotating member 63 at the other end in the axial direction of the support-rotating member 63. The internal gear 2a engages with the first and second planetary gears 61 and 62.

The plurality of first planetary gears 61 (3 in this example) are arranged at predetermined intervals around a centerline of the input rotation member 30. Each of the first planetary gears 61 is rotatably supported by a side surface (lower side surface in FIG. 1) of the input rotation member 30. A teeth part 61a on an outer circumference of each of the first planetary gears 61 engages with the internal gear 2a.

The sun gear 62 is positioned on the centerline of the input rotation member 30. The sun gear 62 is rotated while engaging with the plurality of first planetary gears 61 from the center. A side surface of the sun gear 62 on an input-rotation-member-30 side (lower side surface in FIG. 1) is non-rotatably fixed to the support-rotating member 63. That is, the sun gear 62 and the support-rotating member 63 are kept while being rotatably integrated with each other.

The support-rotating member 63 is a columnar or disk-like member having an outer diameter smaller than that of the internal gear 2a. The support-rotating member 63 is arranged at a center of the fixing member 10 so as to have a gap with the internal gear 2a. The support-rotating member 63 is coaxially fixed with the sun gear 62 on one side surface and supports the second planetary gears 64 (coupled planetary gears) on the other side surface around its central axis.

The plurality of (3 in this example) second planetary gears 64 (coupled planetary gears) are arranged at predetermined intervals around the centerline of the support-rotating member 63. Each of the second planetary gears 64 (coupled planetary gears) is rotatably supported by the side surface (lower side surface in FIG. 1) of the support-rotating member 63. A teeth part 64a on an outer circumference of each of the second planetary gears 64 engages with the internal gear 2a.

The second planetary gears 64 (coupled planetary gears) engage with the sun gear 72 fixed to the one end of the rotation shaft 71 of the rotary motor 70.

In a case where the rotary motor 70 is started and the rotation shaft 71 is rotated, a rotational force is transmitted to the planetary gears 64 (coupled planetary gears) via the sun gear 72.

A characteristic effect of the rotational force transmitting apparatus 100 having the above configuration will be described in detail.

First, in a state in which the rotary motor 70 is not started, i.e., in a state in which a rotational force is not applied to any of the output rotation member 20, the input rotation member 30, the support-rotating member 63, and the like (see FIG. 2), the engagement elements 41 and 42 are pressed by the biasing member 50 and are thrust into the wedge parts between the cam surfaces 21 and 23 and the inner circumferential surface 11a of the housing chamber 11.

Therefore, the output rotation member 20 is kept in a stationary state so as not to be rotated in the one direction (clockwise direction in FIG. 2) or the other direction (counterclockwise direction in FIG. 2).

From the above state, when the rotary motor 70 is started and a rotational force is transmitted to the second planetary gears 64 (coupled planetary gears) via the sun gear 72, the plurality of second planetary gears 64 (coupled planetary gears) supported by the support-rotating member 63 are also revolved around the same central axis of the input rotation member 30 while being rolled and engaging with the other half (lower half in FIG. 1) of the internal gear 2a in the axial direction. Then, the support-rotating member 63 is rotated and the sun gear 62 integrated with the support-rotating member 63 is also rotated. In accordance with this rotation, the plurality of first planetary gears 61 engaging with the sun gear 62 are revolved around the central axis of the input rotation member 30 while being rolled and engaging with one half (upper half in FIG. 1) of the internal gear 2a in the axial direction.

At a time of the rotation, the support-rotating member 63 is supported on both sides in the axial direction by the first planetary gears 61 and the second planetary gears 64 (coupled planetary gears). For this reason, eccentricity or the like does not easily occur in the support-rotating member 63 and the sun gear 62 integrated with the support-rotating member 63, and therefore a stable rotational balance is kept.

In accordance with this revolution of the plurality of first planetary gears 61, the input rotation member 30 supporting the first planetary gears 61 is also rotated.

Figure 4:
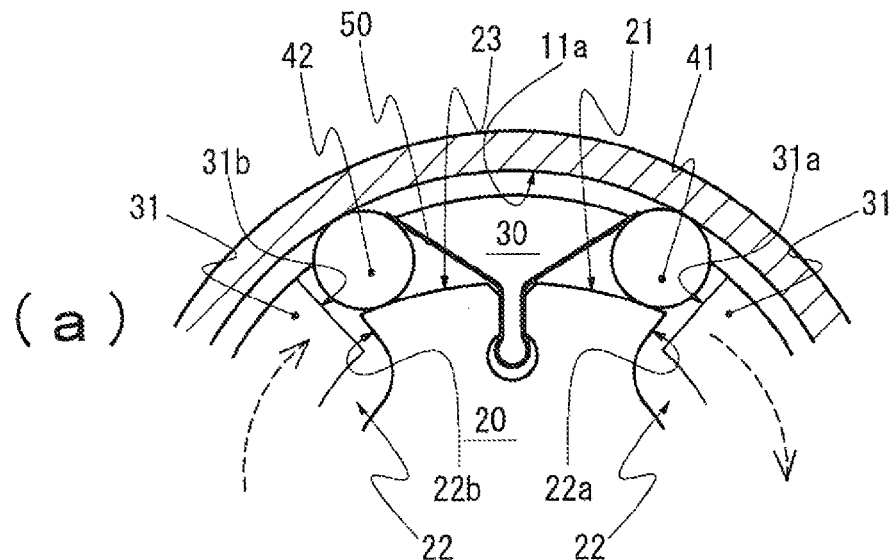
FIG. 4 is an explanatory view of an operation of a clutch mechanism.
Figure 4:
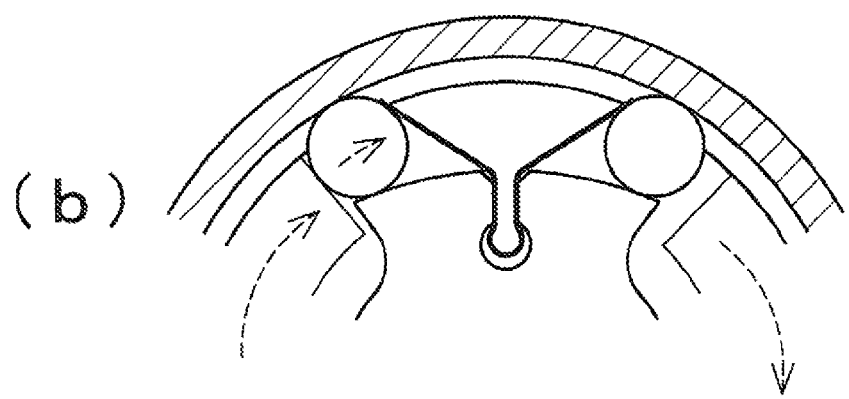
Figure 4:
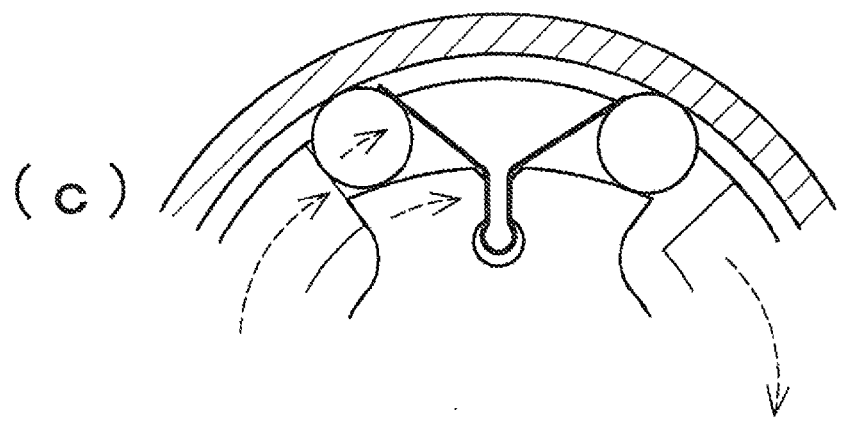

As shown in, for example, FIG. 4, in a case where the input rotation member 30 is rotated in the clockwise direction [FIG. 4(a)], the pressure transmitting part 31 of the input rotation member 30 is first abutted against one of the pair of the engagement elements 42 [FIG. 4(b)]. As a result, friction between the engagement element 42 and the cam surface 23 and friction between the engagement element 42 and the inner circumferential surface 11a of the housing chamber are reduced. Thereafter, the pressure transmitting part 31 is abutted against the pressed surface 22b of the recess 22 to thereby push the output rotation member 20 [FIG. 4(c)]. As a result, the output rotation member 20 is smoothly rotated in the counterclockwise direction.

Although not shown, in a case where a counterclockwise rotational force is applied to the input rotation member 30, the pressure transmitting part 31 of the input rotation member 30 is first abutted against the other of the pair of the engagement elements 41. As a result, friction between the engagement element 41 and the cam surface 21 and friction between the engagement element 41 and the inner circumferential surface 11a of the housing chamber are reduced. Thereafter, the pressure transmitting part 31 is abutted against the pressed surface 22a of the recess 22 to thereby push the output rotation member 20. As a result, the output rotation member 20 is smoothly rotated in the counterclockwise direction.

After driving of the rotary motor 70 is stopped and rotation of the rotation shaft 71 is stopped, in a case where, for example, a clockwise rotational force is applied to the output rotation member 20 from an outside, the other of the pair of the engagement elements 42 is strongly thrust so as to bite into a space between the cam surface 23 of the output rotation member 20 to be rotated in the clockwise direction and the inner circumferential surface 11a of the housing chamber. Therefore, clockwise rotation of the output rotation member 20 is inhibited [state in FIG. 2].

Similarly, in a case where, for example, a counterclockwise rotational force is applied to the output rotation member 20 from the outside, the one of the pair of the engagement elements 41 is strongly thrust so as to bite into a space between the cam surface 21 of the output rotation member 20 to be rotated in the counterclockwise direction and the inner circumferential surface 11a of the housing chamber. Therefore, counterclockwise rotation of the output rotation member 20 is inhibited [state in FIG. 2].

Therefore, jolting in an input-side rotation member such as the planetary gear mechanism 2, in the circumferential direction, the jolting being caused by backlash, a slight gap in a power transmitting part or the like, can be reduced, and occurring of relatively larger jolting in the stationary output rotation member 20 in the circumferential direction due to such jolting accumulated on an output side can be reduced.

The clutch mechanism 1 and the planetary gear mechanism 2 are arranged in the axial direction in the integrated tubular fixing member 10. That is, the inner circumferential surface of the fixing member 10 is effectively used in the axial direction. Therefore, it is possible to easily have a thin and small structure and have excellent productivity.

Note that, as a configuration added to the rotational force transmitting apparatus 100, a configuration is also applicable such that a rotational force is inputted to the support-rotating member 63 by directly coupling and fixing the input shaft 71 of the rotary motor 70 with the support-rotating member 63 without contacting any of the gears illustrated in the drawings.

As another example, the sun gear 62 having the above structure, the rotating member 63 fixed to be rotatably integrated with the sun gear 62, the plurality of second planetary gears 64 (coupled planetary gears) rotatably supported by the support-rotating members 63, and the internal gear 2a that is provided on the inner circumferential surface of the fixing member 10 so as to engage with the plurality of second planetary gears 64 can be provided at multi-stages (e.g., two or more stages or three or more stages) on an input side of the first planetary gears 61 so that a rotational force is transmitted in the axial direction.

In the rotational force transmitting apparatus 100, the number of teeth of the first planetary gears 61 and the number of teeth of the second planetary gears 64 (coupled planetary gears) may be the same. As another example, the number of teeth of the first planetary gears 61 and the number of teeth of the second planetary gears 64 may be different. In this case, the internal gear 2*a* is divided in the axial direction so as to correspond to the numbers of teeth of the first and second planetary gears 61 and 64, and divided one half engage with the first planetary gears 61 and divided the other half engage with the second planetary gears 64 (coupled planetary gears).

In order to have a satisfactory rotational balance between the support-rotating member 63 and the sun gear 62 in the rotational force transmitting apparatus 100, the first and second planetary gears 61 and 64 are provided on both sides of the support-rotating member 63. As another example, the second planetary gears 64 (coupled planetary gears) can be removed from the configuration of the rotational force transmitting apparatus 100.

In this embodiment, the support-rotating member 63 can be also removed to directly input a rotational force of the input shaft 71 to the sun gear 62.

In the rotational force transmitting apparatus 100 in the illustrated example, the fixing member 10 is a single tubular member. However, as another example, the fixing member 10 can be also constituted by a plurality of tubular members.

In the clutch mechanism 1, even in a case where either a rotational force in the one direction or a rotational force in the other direction (clockwise direction or counterclockwise direction) is applied to the output rotation member 20 from the outside, the output rotation member 20 is restrained by actions of the engagement elements 41 and 42 and the like. As another example, an embodiment is also applicable so as to restrain the output rotation member 20 only in a case where a rotational force in one of the one direction and the other direction.

This embodiment may have, for example, a configuration such that all of the one of the pair of the engagement elements 41 is removed from the clutch mechanism 1. With this configuration, in a case where a rotational force in the one direction (clockwise direction in FIG. 2) is applied to the output rotation member 20, the engagement elements 42 are thrust into the wedge parts between the inner circumferential surface 11*a* of the housing chamber and the cam surfaces 23. As a result, rotation of the output rotation member 20 can be inhibited.

Meanwhile, in a case where a rotational force in the other direction (counterclockwise direction in FIG. 2) is applied to the output rotation member 20, the engagement elements 42 are inclined to separate away from the wedge parts between the inner circumferential surface 11*a* of the housing chamber and the cam surfaces 23. Therefore, the friction between the engagement elements 42 and the inner circumferential surface 11*a* of the housing chamber and the friction between the engagement elements 42 and the cam surfaces 23 are reduced. As a result, the output rotation member 20 can be smoothly rotated.

In a case where a rotational force in the one direction is applied to the input rotation member 30, the pressure transmitting parts 31 are abutted against the engagement elements 42 and thereafter press the pressed surfaces 22*b* of the recesses 22. Meanwhile, in a case where a rotational force in the other direction is applied to the input rotation member 30, the pressure transmitting parts 31 press the pressed surfaces 22*a* of the recesses 22 without being abutted against any engagement elements. Therefore, regardless of the rotational directions, a rotational force of the input rotation member 30 can be smoothly transmitted to the output rotation member 20.

With the configuration of the clutch mechanism 1, the output rotation member 20 is rotatably supported by the fixing member 10 and the input rotation member 30 is rotatably supported by the output rotation member 20. This support structure only needs to be structured such that the output rotation member 20 and the input rotation member 30 are rotated in both directions. As another example, a structure in which the output rotation member 20 and the input rotation member 30 are rotatably supported by a single shaft member can be also applicable.

In the clutch mechanism 1, 3 sets of the cam surfaces 21 and 23, the recesses 22, the engagement elements 41 and 42, the biasing members 50, and the like are provided on the outer circumferential part of the output rotation member 20. As another example, 2 sets or 4 or more sets thereof can be provided.

LIST OF REFERENCE NUMERALS

1: Clutch mechanism
2: Planetary gear mechanism
2*a*: Internal gear
10: Fixing member
11: Housing chamber
11*a*: Inner circumferential surface of housing chamber
20: Output rotation member
21, 23: Cam surface
22: Recess
22*a*, 22*b*: Pressed surface
30: Input rotation member
31: Pressure-transmitting part
31*a*, 31*b*: Abutting surface
41, 42: Engagement element
50: Biasing member
61: First planetary gear
62: Sun gear
63: Support-rotating member
64: Second planetary gear (coupled planetary gear)
100: Rotational force transmitting apparatus

The invention claimed is:

1. A rotational force transmitting apparatus comprising a clutch mechanism and a planetary gear mechanism having a sun gear, the rotational force transmitting apparatus being configured to couple the clutch mechanism and the planetary gear mechanism to each other in an axial direction in a fixing member to output from an output rotation member of the clutch mechanism a rotational force inputted to the sun gear of the planetary gear mechanism, wherein:
the clutch mechanism includes
a housing chamber having a columnar space,
the output rotation member coaxially housed in the housing chamber,
an input rotation member coaxially disposed on the output rotation member,
engagement elements disposed between an inner circumferential surface of the housing chamber and an outer circumferential surface of the output rotation member, and
biasing members configured to bias the respective engagement elements toward one side in a circumferential direction;

the clutch mechanism is configured such that
cam surfaces are disposed on the outer circumferential surface of the output rotation member so that a distance between each of the cam surfaces and the inner circumferential surface of the housing chamber is gradually reduced toward the one side in the circumferential direction and in a case where the input rotation member is rotated toward the other side opposite to the one side in the circumferential direction, the input rotation member is configured to be abutted against the engagement elements and thereafter abutted against the output rotation member to thereby push the output rotation member;

the planetary gear mechanism includes
a plurality of first planetary gears rotatably supported by the input rotation member, and
the sun gear engaging with the plurality of first planetary gears from a center; and the fixing member has an inner circumferential surface having a substantially columnar shape, the inner circumferential surface on one side in the axial direction constituting the housing chamber, the inner circumferential surface on the other side in the axial direction constituting a first internal gear engaging with the plurality of first planetary gears, wherein the clutch mechanism includes
recesses each of which is adjacent to the one side of the cam surface and is provided on the outer circumferential surface of the output rotation member;

pressure transmitting parts each of which is provided on the input rotation member, is fitted into the recess with play in the circumferential direction, and is protruded from an inside of the recess in a centrifugal direction; and in a case where the input rotation member is rotated toward the other side, the pressure transmitting parts are abutted against the engagement elements to thereby push the engagement elements, and thereafter the pressure transmitting parts are abutted against end surfaces in the circumferential direction of the recesses to thereby push the output rotation member.

2. The rotational force transmitting apparatus according to claim 1, further comprising:
wherein the planetary gear mechanism includes
a support-rotating member fixed to and integrated with the sun gear on one side of the sun gear in the axial direction to be rotatable with the sun gear;
a plurality of second planetary gears rotatably supported by the support-rotating member; and
a second internal gear engaging with the plurality of second planetary gears, the second internal gear being provided on the inner circumferential surface of the fixing member,
wherein the sun gear, the support-rotating member, the plurality of second planetary gears, and the second internal gear are provided so that a rotational force is transmitted in the axial direction.

3. The rotational force transmitting apparatus according to claim 1,
wherein the cam surface is a convex surface curved in the circumferential direction.

4. The rotational force transmitting apparatus according to claim 3,
wherein:
the engagement elements are provided in pair;
each of the biasing members is configured to bias the pair of the engagement elements so that one of the pair of the engagement elements is biased toward one side and the other thereof is biased toward the other side, the one side and the other side being opposite to each other in the circumferential direction;
the cam surfaces includes multiple sets of first cam surfaces and second cam surfaces which are provided in the circumferential direction, the first cam surfaces being provided so that a distance between each of the first cam surfaces and the inner circumferential surface of the housing chamber is gradually reduced toward the one side, the second cam surfaces being provided so that a distance between each of the second cam surfaces and the inner circumferential surface of the housing chamber is gradually reduced toward the other side;
the one of the pair of the engagement elements is arranged to be brought into contact with the first cam surface and the inner circumferential surface of the housing chamber, and the other of the pair of the engagement elements is arranged to be brought into contact with the other cam surface and the inner circumferential surface of the housing chamber; and
in a case where the input rotation member is rotated toward the other side, the input rotation member is configured to be abutted against the one of the pair of the engagement elements and thereafter abutted against the output rotation member to thereby push the output rotation member toward the other side, and, in a case where the input rotation member is rotated toward the one side, the input rotation member is configured to be abutted against the other of the pair of the engagement elements and thereafter abutted against the output rotation member to thereby push the output rotation member toward the one side.

* * * * *